(12) United States Patent
Cai et al.

(10) Patent No.: US 11,370,036 B2
(45) Date of Patent: Jun. 28, 2022

(54) ONE UP ASSEMBLY AIRCRAFT PANEL DRILLING SYSTEM

(71) Applicant: The Boeing Company, Chicago, IL (US)

(72) Inventors: Fei Cai, Edmonds, WA (US); Tanni Sisco, Mukilteo, WA (US); Matthew Ryan Dunaj, Saint Clair, MI (US); Brian Joseph Cobb, Columbiaville, MI (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 15/333,915

(22) Filed: Oct. 25, 2016

(65) Prior Publication Data

US 2018/0111701 A1   Apr. 26, 2018

(51) Int. Cl.
*B23B 39/24* (2006.01)
*B64F 5/10* (2017.01)
(Continued)

(52) U.S. Cl.
CPC .............. *B23B 39/24* (2013.01); *B23B 35/00* (2013.01); *B25J 9/1687* (2013.01);
(Continued)

(58) Field of Classification Search
CPC ........ B21J 15/42; B21J 15/142; F16B 19/109; F16B 5/0258; F16B 5/0642;
(Continued)

(56) References Cited

U.S. PATENT DOCUMENTS 1,949,007 A    3/1931   Butler
4,885,836 A   12/1989   Bonomi et al.
(Continued)

FOREIGN PATENT DOCUMENTS

CN    101898301 A    12/2010
EP      0338117 A2   10/1989
(Continued)

OTHER PUBLICATIONS

Electroimpact, Inc., "Electroimpact Multifunction Flex Track Temporary Fasteners", published Oct. 23, 2013, YouTube video, https://www.youtube.com/watch?v=tbJmjwZ-o6c.*
(Continued)

*Primary Examiner* — Matthew P Travers
(74) *Attorney, Agent, or Firm* — Quinn IP Law (57) ABSTRACT

An end effector provides one up assembly drilling through mated components, including a panel, by preloading the components. The end effector includes a drill and clamp dispenser for temporarily inserting and removing expansible single-sided clamps at various pre-drilled locations in the panel. In one method, pilot holes are first pre-drilled into mated components, for example an aircraft wing panel and a wing rib or spar; an initial pilot hole location is identified, and an expansible clamp is inserted into a pilot hole adjacent a desired initial fastener hole location. The clamp is torqued, causing its expansion for preloading the wing panel and rib and/or spar components under a predetermined load. The fastener hole is then drilled, the end effector untorques and removes the clamp and identifies a second (and/or next) pilot hole location, and the process is replicated.

20 Claims, 10 Drawing Sheets

(51) Int. Cl.
  *B23B 35/00* (2006.01)
  *F16B 5/06* (2006.01)
  *B25J 9/16* (2006.01)
  *B25J 11/00* (2006.01)
  *B64C 1/12* (2006.01)
  *B23P 19/00* (2006.01)

(52) U.S. Cl.
  CPC ............ *B25J 11/0055* (2013.01); *B64C 1/12* (2013.01); *B64F 5/10* (2017.01); *F16B 5/0642* (2013.01); *B23B 2215/04* (2013.01); *B23B 2270/08* (2013.01); *B23P 19/001* (2013.01); *G05B 2219/45059* (2013.01); *G05B 2219/45064* (2013.01)

(58) Field of Classification Search
  CPC . F16B 19/1081; B23B 39/24; B23B 2270/08; B23B 2215/04; B23B 35/00; B25J 9/1687; B64C 1/12; B64C 3/26; B64F 5/10; G05B 2219/45064; G05B 2219/45059; B23P 19/001; B23P 19/004; B23P 19/006; B23P 19/007; B23P 19/04; B23P 19/06; B23P 23/04; B23P 2700/01; Y10T 29/49954; Y10T 29/49959–49961; Y10T 29/5152; Y10T 29/5176; Y10T 29/53478; Y10T 29/53678; Y10T 29/53983
  See application file for complete search history.

(56) References Cited

U.S. PATENT DOCUMENTS

| | | | |
|---|---|---|---|
| 5,050,288 A | 9/1991 | Woods | |
| 6,098,260 A | 8/2000 | Sarh | |
| 6,949,057 B2 | 9/2005 | Everson et al. | |
| 8,805,575 B1* | 8/2014 | Bloch | B21J 15/32 221/1 |
| 2003/0034355 A1* | 2/2003 | Bloch | B21J 15/32 221/13 |
| 2004/0075206 A1* | 4/2004 | Starr | B21J 15/42 269/25 |
| 2008/0244888 A1* | 10/2008 | Sarh | B21J 15/14 29/402.01 |
| 2010/0217437 A1* | 8/2010 | Sarh | B25J 9/0084 700/248 |
| 2010/0308171 A1* | 12/2010 | Kelley | B23P 19/04 244/132 |
| 2015/0298825 A1* | 10/2015 | Cole | B23Q 3/183 29/426.1 |
| 2016/0067783 A1* | 3/2016 | Carson | B23B 3/065 82/1.11 |
| 2016/0243702 A1* | 8/2016 | Crothers | B25J 9/009 |
| 2016/0312815 A1* | 10/2016 | Bigot | B23P 19/04 |
| 2018/0001484 A1* | 1/2018 | Hirashima | B23B 39/166 |

FOREIGN PATENT DOCUMENTS

| | | |
|---|---|---|
| EP | 2221151 A2 | 8/2010 |
| JP | 2010194710 A | 9/2010 |

OTHER PUBLICATIONS

Samuel O. Smith, "New Blind, Doweling, Temporary Fastener Design and Testing" (White Paper 2009-01-3184), Electroimpact, Nov. 10, 2009.*

Assadi et al., "Body Join Drilling for One-Up-Assembly" (White Paper 2013-01-2296), Electroimpact, Sep. 17, 2013.*

Cleco Fasteners, "What Are Cleco Fasteners?", available online Jun. 16, 2016, https://web.archive.org/web/20160616135813/http://clecofasteners.info/ (Year: 2016).*

2008-01-2297 "One Up Assembly with Robots" Russell DeVlieg, Electroimpact, Inc. and Edward Feikert, The Boeing Company—Copyright 2008 SAE International.

Search Report for related European Application No. 17187407.6; report dated Mar. 22, 2018.

Office Action for related European Application No. 17187407.6; report dated Jul. 8, 2020.

Office Action for related Russian Application No. 2017129751/11; report dated Dec. 29, 2020.

* cited by examiner

ONE UP ASSEMBLY AIRCRAFT PANEL DRILLING SYSTEM

FIELD

The present disclosure relates generally to apparatus configured and programmed to drill and secure exterior panels, such as aircraft skins, to connective structures such as frames, stringers, ribs and/or spars, and more specifically to end effectors designed to facilitate so-called "one up assembly" drilling; i.e., without requiring separation of such paired components for deburring, cleaning, and/or sealing after drilling fastener holes through the components.

BACKGROUND

Commercial aircraft manufacturing has historically been labor intensive, and thus expensive. As such, there is constant motivation for aircraft manufacturers to develop less costly procedures and techniques. One such initiative concerns assembly of exterior aircraft wing panels also called wing skins, to interior ribs and/or spar structures of aircraft. For example, although many techniques have been utilized in the manufacture of aircraft wings, and particularly in so-called final "close out" attachment of wing skins to wing ribs and/or spar structures, most such techniques continue to be burdened by time-consuming manual drilling, cleaning, and sealing processes.

For example, one approach involves use of handheld drills and separate manual applications of transient clamp loads in strategic places to avoid having to separate and deburr, clean, and seal the panels and ribs, spars, and/or other connective structures after drilling holes for receiving fasteners during close out. Although this approach has met with success, it remains more tedious and time-consuming than desired.

SUMMARY

In a one form of the disclosure, an end effector is adapted for a one up assembly to secure a pair of components including a panel under clamp loads sufficient to avoid in-process separation of the panel from its paired component for deburring. The end effector includes an automated drilling head having a drill and an expansible clamp dispenser adapted to insert, expand, and remove expansible clamps into and out of various pre-drilled pilot holes during a final drilling operation, prior to fastening the panel and its paired component together. The expansible clamp dispenser assures tight securement of the panel and its paired component, under temporarily applied predetermined clamping forces between the panel and component during each instance of automated drilling of a fastener hole.

In another form of the disclosure, a system of using a plurality of electronically programmable end effectors is provided; each end effector including a drilling head having a drill, and an expansible clamp dispenser configured to insert, expand, and remove expansible clamps into and out of various pre-drilled holes in a portion of an aircraft panel during a one up assembly drilling process in advance of securing the panel to a component. The system includes each end effector having an expansible clamp holster configured to supply and retrieve expansible clamps to tightly secure together a portion of the panel and paired component under predetermined forces during each instance of an automated final drilling of a fastener hole in the panel and paired component.

In yet another form of the disclosure, a method of providing a one up assembly of an aircraft wing skin to a wing box includes steps of providing the wing skin to a wing box containing exposed wing rib and/or spar structures; pre-drilling pilot holes in the wing skin; applying the wing skin to the rib and/or spar structures; applying a programmable end effector having a drill head and an expansible clamp dispenser to the exterior of the wing skin; identifying a first pilot hole adjacent an initial fastener hole location; using the end effector dispenser to temporarily insert an expansible clamp into the first pilot hole; using the end effector to torque the expansible clamp after its insertion to achieve a predetermined force between the wing skin and rib and/or spar structures; using the end effector to drill a set of fastener holes adjacent the first pilot hole; using the end effector to untorque and remove the expansible clamp, and successively indexing the end effector to a next position to replicate the same steps for drilling additional sets of fastener holes. The method provides that fastener holes may be drilled in an aircraft wing panel and interior wing rib and/or spar structures under clamp loads sufficient to avoid in-process wing panel separations for deburring, cleaning, and sealing.

All features, aspects, functions, and advantages disclosed herein may be achieved independently in various embodiments or may be combined in or with yet other embodiments, the details of which may be better appreciated with reference to the following description and drawings.

It should be understood that referenced drawings are not necessarily to scale, and that the variously disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in its application or use.

DETAILED DESCRIPTION

The following detailed description is intended to provide both apparatus and methods for carrying out the disclosure. Actual scope of the disclosure is as defined by the appended claims.

Figure 1:
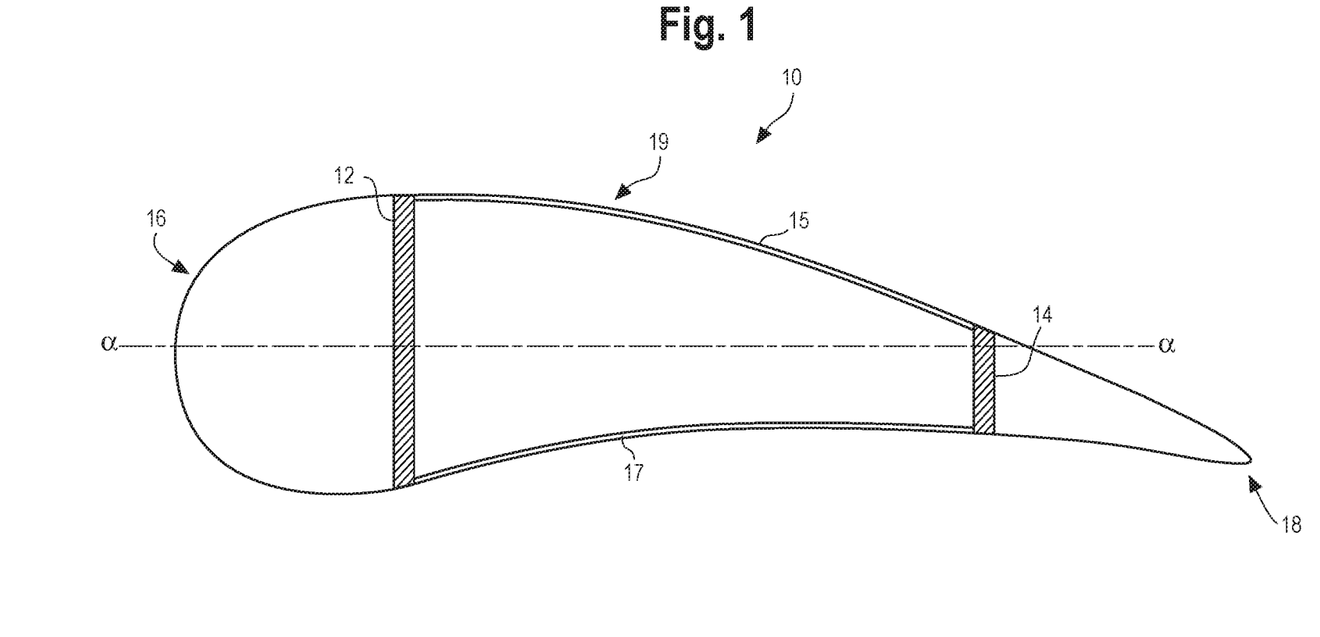
FIG. 1 is a schematic cross-sectional view of an aircraft wing of a type that may be used on a commercial aircraft.

Referring initially to FIG. 1, a cross-sectional view of an aircraft wing 10 is depicted schematically along a longitudinal axis "a-a", oriented along a general direction of flight. The wing 10 includes an interior forward wing spar 12, an interior rear wing spar 14, and top and bottom exterior wing surfaces 15 and 17, respectively. The wing 10 includes a leading edge 16 and a trailing edge 18. A wing box 19 is formed and defined by the boundaries of the forward wing spar 12, the rear wing spar 14, the top wing surface 15 and bottom wing surface 17. The forward wing spar 12 is situated near the leading edge 16 of the wing 10, while the rear wing spar 14 is situated near the trailing edge 18 of the wing 10. Although the apparatus and methods of this disclosure focus particularly on the wing box 19, as a discreet portion of the wing 10 of FIG. 1, the same apparatus and methods are equally applicable to applying fuselage skins to interior frames and stringers.

Figure 2:
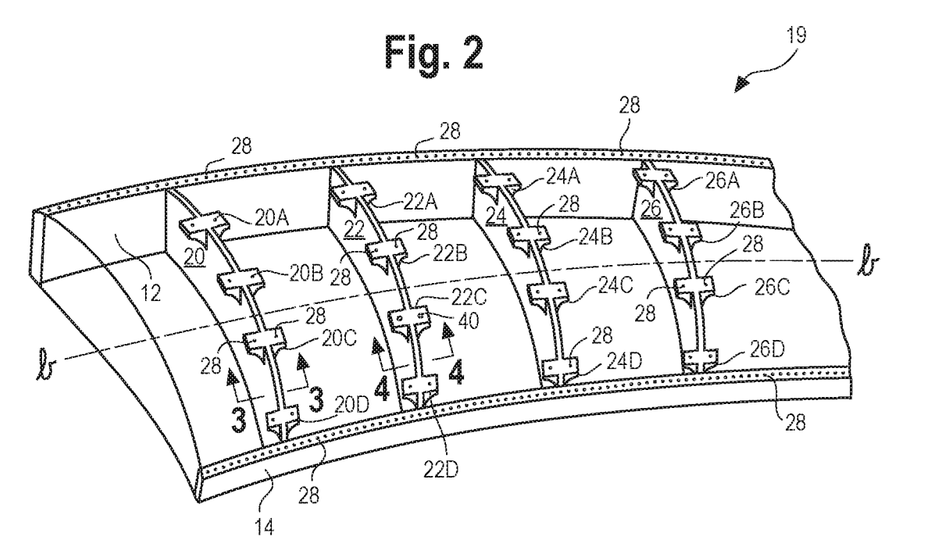
FIG. 2 is a perspective view from above of a wing box portion of the aircraft wing of FIG. 1, shown under construction.
Figure 4:
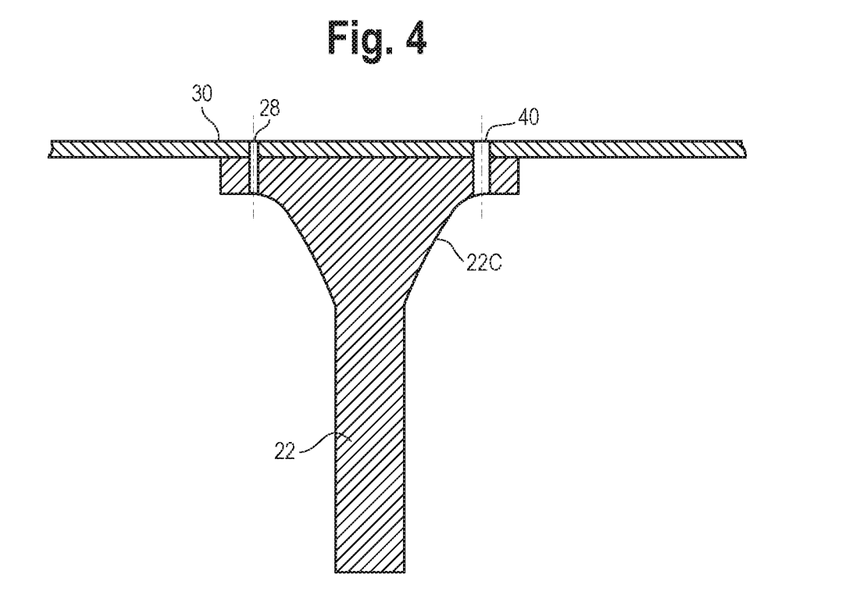
FIG. 4 is a cross-sectional depiction taken along lines 4-4 of FIG. 2, showing a portion of a wing panel as might appear if positioned atop of the wing rib structure shown in FIG. 2.

Referring now to FIG. 2, the wing box 19, which extends laterally along an axis "b-b", is shown during its manufacture, i.e. without an upper wing panel, also known as an upper wing skin 30 (FIG. 4). Extending between the forward and rear laterally extending wing spars 12 and 14, respectively, the wing box 19 includes a plurality of laterally spaced interior ribs 20, 22, 24, 26, each rib extending longitudinally, thus providing fore-aft interconnecting stiffeners, between the two wing spars 12, 14. Although only four ribs are shown for sake of simplicity, commercial aircraft wings will typically include many times the number of ribs shown and described herein.

Figure 3:
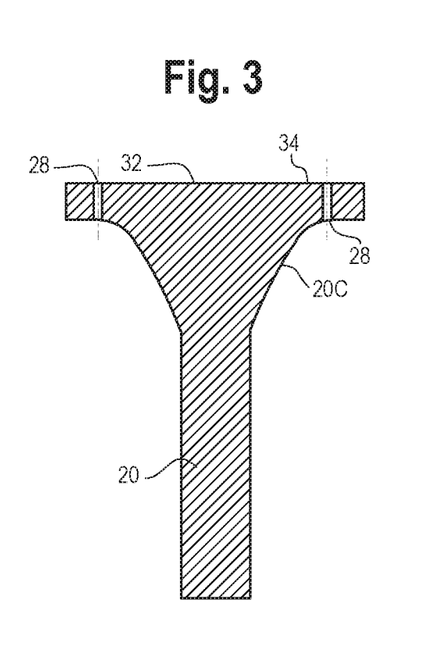
FIG. 3 is a cross-sectional view of a wing rib structure, taken along lines 3-3 of FIG. 2.

For purposes of securing the wing skin 30, each rib 20, 22, 24, 26 includes a plurality of integrally formed top brackets, also called share ties in the commercial aircraft manufacturing industry. For example, the rib 20 includes brackets 20A, 20B, 20C, and 20D, while the rib 22 includes brackets 22A, 22B, 22C, and 22D, as shown. Similarly, ribs 24 and 26 include similarly identified brackets. Referring now also to FIGS. 3 and 4, in order to attach the upper wing skin 30 (FIG. 4) to the forward and rear wing spars 12 and 14, and to the ribs 20, 22, 24, and 26, a plurality of pilot holes 28 (FIGS. 2 and 3) are pre-drilled into the wing skin 30, the wing spars 12, 14 (FIG. 2), and also into an upper surface 34 (FIG. 3) in each of the brackets 20A-D, 22A-D, 24A-D, and 26A-D (FIG. 2). Those skilled in the art will appreciate that the upper surface 34 of each bracket is coterminous with, and defines the top surface 32 of, each rib 20, 22, 24, 26. In addition, each pilot hole 28 is a smaller hole than a fastener hole 40, as for example shown in the bracket 22C (FIGS. 2 and 4), for reasons explained below. The wing skin 30 is ultimately placed and secured atop of the spars 12, 14, and over the upper surfaces 32 (FIG. 3) of the ribs 20, 22, 24, 26 (FIG. 2) for final close out the aircraft wing box 19.

Figure 5:
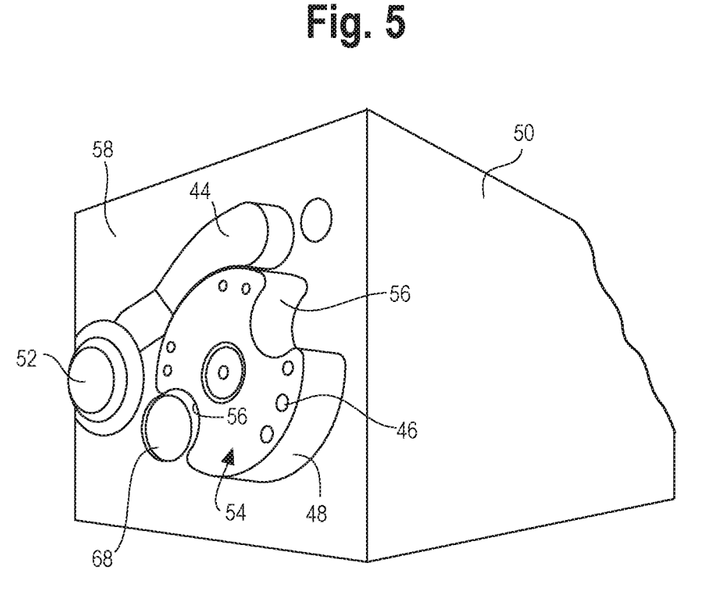
FIG. 5 is a fragmentary perspective view of a working end of an automated end effector constructed in accordance with the present disclosure.
Figure 6:
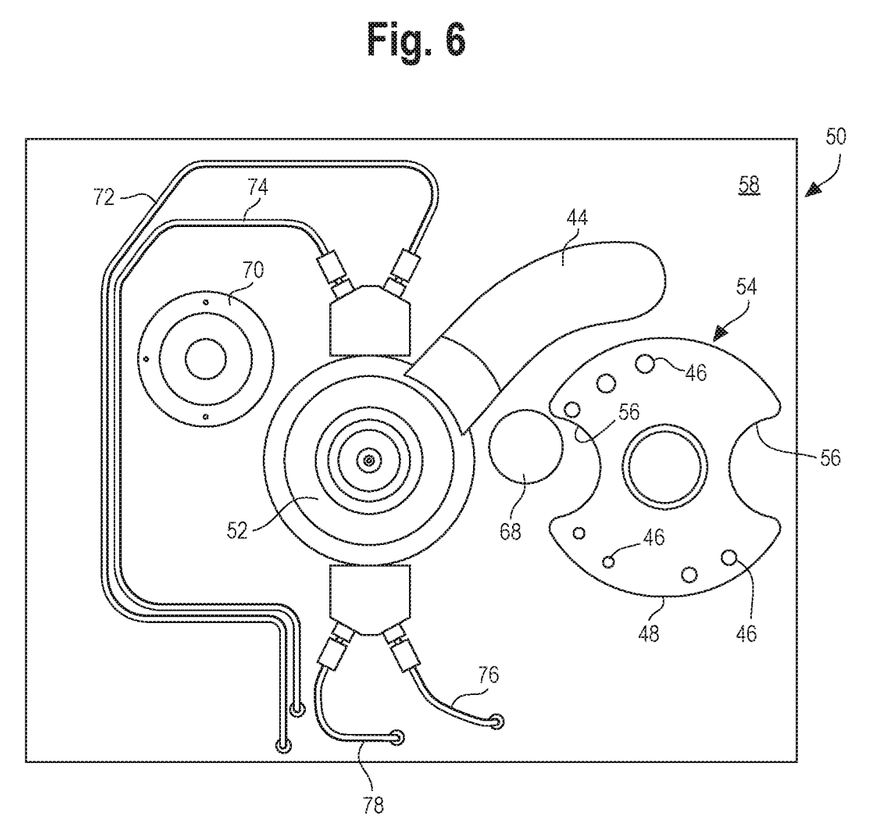
FIG. 6 is a frontal or face view of the working end of the automated end effector depicted in FIG. 5.
Figure 7:
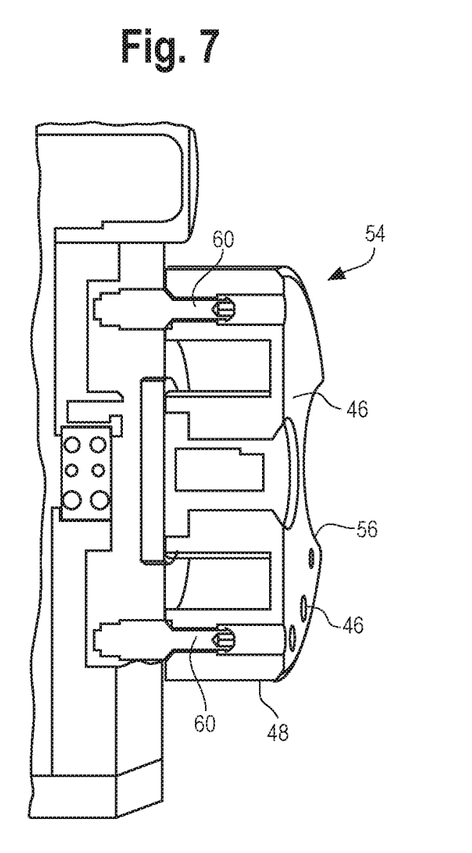
FIG. 7 is a perspective cutaway view of a portion of the automated end effector of the present disclosure.

All examples in this disclosure relate to an apparatus, a method, and/or a system for securing the wing skin 30 to the wing spars 12, 14, and to the various brackets 20A-D, 22A-D, 24A-D, and 26A-D. Referring now also to FIGS. 5, 6, and 7, in order to avoid tedious and time consuming processes associated with use of manual tools for securing wing skins to aircraft wing structures, an automated end effector 50 (FIG. 5) may be employed to facilitate a one up assembly drilling operation from one side of an aircraft wing skin 30 (FIG. 4) for its ultimate securement to a plurality of the afore-described wing rib and spar structures. As the one up assembly process is designed to avoid post-drilling separations of the wing skin 30 from the wing ribs and spars for deburring, cleaning, and sealing of mated components intended to ultimately be fastened together, the end effector 50 utilizes a system of temporary clamps to preload the mated components together prior to initiation of any actual drilling sequence.

Figure 8:
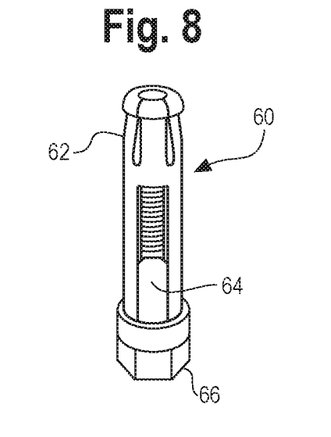
FIG. 8 is a perspective view of an expansible clamp used in the automated end effector of the present disclosure.

For this purpose, the end effector 50 utilizes expansible clamps 60 (FIGS. 7 and 8) for application of transiently applied clamping forces between the mated components for the drilling of fastener holes 40. The clamps may be inserted into the pilot holes 28, in preparation for installation of actual fasteners (not shown). Physical installation of the fasteners may occur in a follow-up sequence at a different assembly station, neither shown nor part of this disclosure.

The face 58 of the end effector 50 (FIGS. 5 and 6) incorporates a vacuum chute 44 designed for removal of cutting debris including dust and chips from the drilling process. An expansible clamp holster 54 is configured to hold various sizes of the expansible clamps 60, which are contained in various sized apertures 46. Different sized clamps 60 are needed for accommodating variable thickness of an aircraft skin, which may have a thickness at an inboard edge of the wing box 19 that may be greater than five times the thickness at an outboard edge. The expansible clamp holster 54 is rotatable, as well as indexable, so as to be able to sequentially dispense variously sized expansible clamps 60, and to then rotate one of a pair of notches 56 (FIGS. 5 and 6), situated within a rounded side 48 of the holster 54, to a position to accommodate an expansible clamp installer/remover mechanism 68. The installer/remover mechanism 68 is designed to insert and torque, and to later untorque and remove, an expansible clamp 60 in serial fashion, as described below. The multiple sized apertures 46 contain clamps 60 in a variety of sizes, such as Centrix® brand single-sided expansible clamp available in multiple sizes, and sold by Centrex, LLC of Kent, Wash., USA.

The three-dimensional holster 54 is spaced from the drilling nose 52 (FIGS. 5 and 6), and both the holster 54 and the drilling nose extend from the face 58 of the end effector 50. The drilling nose 52 is designed to hold a drill bit 96 (of a type shown in FIG. 9). As disclosed, once a skin 30 (FIG. 4) is applied over the exposed ribs 20, 22, 24, 26, and spars 12, 14, of the wing box 19 (FIG. 2), the end effector 50 may be programmed to identify an initial pilot hole 28 adjacent an initial desired fastener hole location. The expansible clamp holster 54 can then be indexed to position one of the notches 56 over the expansible clamp installer/remover mechanism 68. The mechanism 68 then sequentially inserts an expansible clamp 60 retrieved from an aperture 46 of the holster 54 into a pre-drilled pilot hole 28 (FIGS. 2 and 3) adjacent the initial fastener hole location. The mechanism 68 then firmly installs the inserted expansible clamp 60 by torquing a fastener head 66 (FIG. 8) of the expansible clamp 60, thus rotating an internal threaded bolt 64 of the clamp, until an insertion end 62 thereof expands to provide a predetermined clamp force between the mating components (e.g. skin 30 and spar 12).

The end effector 50 is programmed to drill a set of fastener holes in predetermined locations most adjacent, i.e., immediately surrounding, the temporarily installed expansible clamp 60. Thereafter, the end effector untorques and removes the expansible clamp 60, and successively indexes to a next position to replicate identical steps for continued drilling of multiple fastener holes.

In the disclosed embodiments, the holster 54 is modular, and removable for cleaning and reloading. Ideally, the predetermined clamping force provided by the expansible clamp 60 will at least equal the drilling force required to create the fastener hole. Such clamping forces have been determined to be sufficient to avoid creation of burrs between mated components, which disrupts integrity of the component interface and requires subsequent panel separations for deburring, cleaning, and sealing. Finally, it will be appreciated that steps of cleaning and sealing of the panel and its mating rib and/or spar structures would occur in advance of any given one up assembly drilling operation; i.e., prior to actual drilling of a wing skin and its mating the rib and spar structures, for example.

The disclosed system of using a rotary expansible clamp holster 54, entirely contained within the end effector 50, to both dispense and retrieve temporary expansible clamps 60, assures a tight mating of wing skin, rib, and spar components under predetermined transiently applied forces during each instance of automated drilling of fastener holes through the mated structures.

Continuing reference to FIG. 6, a camera 70 may be included as part of a programmable vision system (not shown) to facilitate programmed movements of the end effector 50 over the wing box 19. In addition, various hydraulic and/or pneumatic lines 72, 74, 76 and 78 may be included for controlling various operational aspects/functions of the end effector 50.

Figure 9:
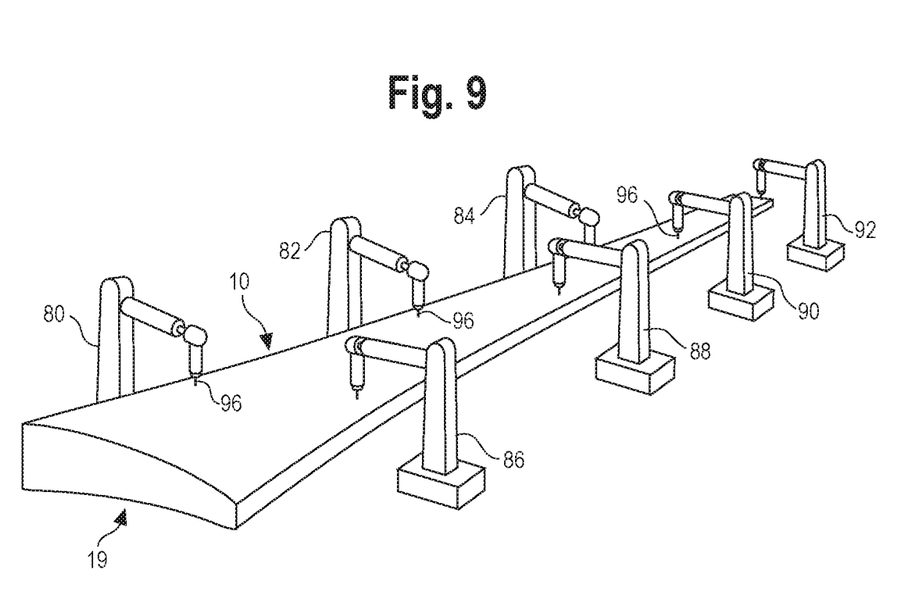
FIG. 9 is a perspective view of a plurality of automated end effectors utilizing the disclosed technology to drill fastener holes through preselected locations in the upper wing panel of FIG. 4 and into the ribs and/or spars of the wing box of FIG. 2.

Referring to FIG. 9, a system of end effectors 80, 82, 84 may be provided to drill fastener holes in forward wing spar and rib bracket areas of the wing box 19, while another system of end effectors 86, 88, 90, 92 may be provided to similarly work simultaneously over rear wing spar and rib bracket areas of the wing box 19. Each of the end effectors have drill bits 96 that can be managed by a computer database and operating program (neither shown).

Figure 10:
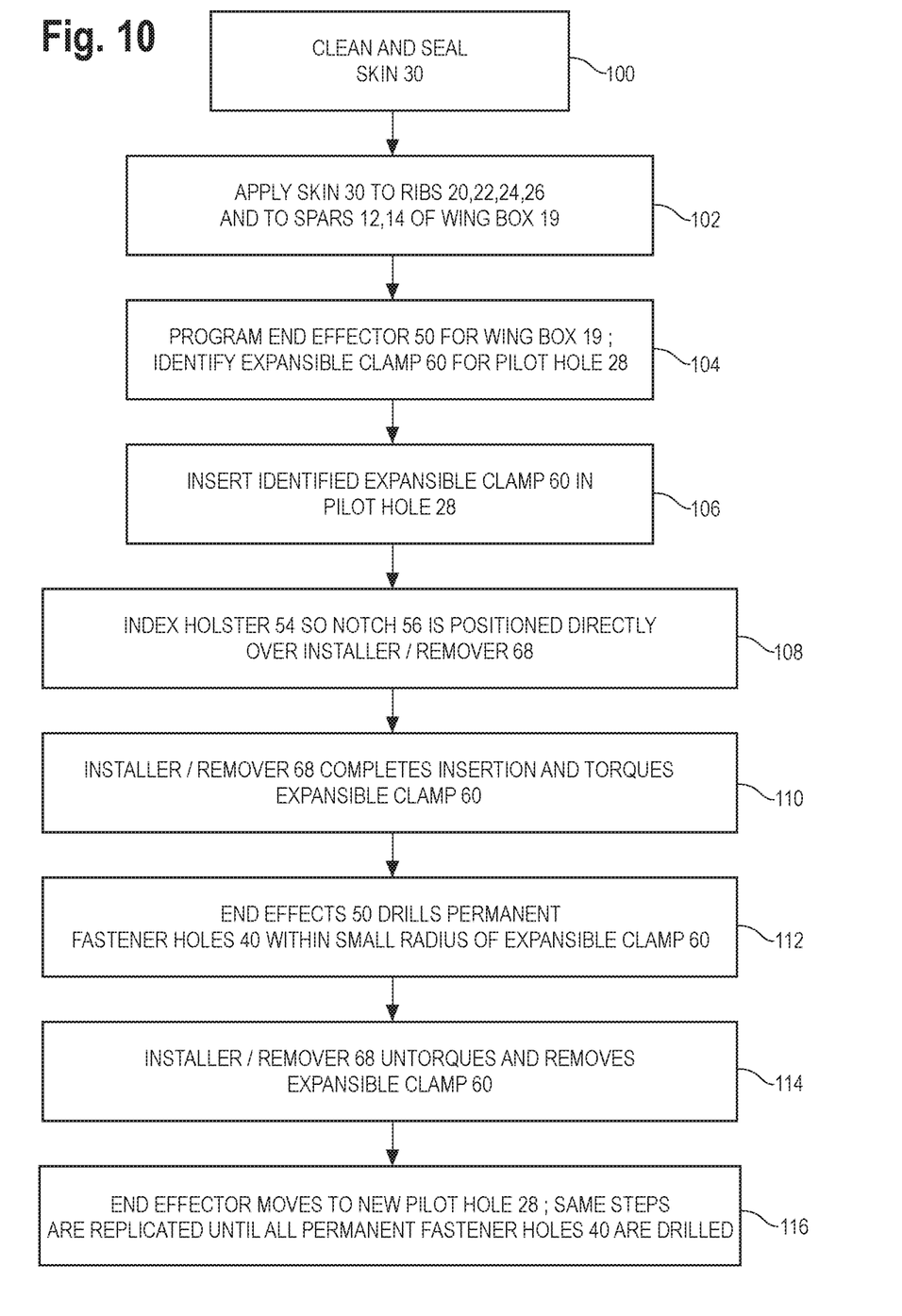
FIG. 10 is a flowchart detailing one method of application of the present disclosure.

An Exemplary Method:
Assumptions:
  A) Use of Centrix® brand single-sided expansible clamps, having sizes between $1/16$ and 1 inch, with load ratings of up to 2,000 lbs. of clamping force.
  B) Pilot holes are at least $1/16$ inch bore sized.
  C) Each share tie or bracket 20A-D, 22A-D, 24A-D, and 26A-D (FIG. 2) includes at least one pre-drilled pilot hole, and the upper bracket surface 34 has a surface area of at least 10 square inches.
  D) Each fastener hole diameter is at least $3/16$ inch.
Method Details:
Referring also now to the flowchart of FIG. 10, the following steps may be implemented for a one up assembly drilling operation, in accordance with the above disclosure:
  1) The interior surface of a skin 30 is first cleaned, and a sealing material is applied.
  2) The skin 30 is next applied over the exposed ribs 20, 22, 24, 26, and spars 12, 14, of the wing box 19 (FIG. 2).
  3) The end effector 50 is programmed for the particular size and configuration of the wing box 19, and identifies an initial pre-drilled pilot hole 28 adjacent an undrilled location of an initial fastener hole 40, and inserts an appropriately sized expansible clamp 60 into the pilot hole 28.
  4) The holster 54 is next indexed so as to position one of the notches 56 directly over the installer/remover 68.
  5) The end effector 50 inserts an identified expansible clamp 60 (e.g., one $1/16$ inch Centrix® brand single-sided expansible clamp) into the pilot hole 28 of both skin 30 and a bracket, for example, for purpose of clamping those mating components tightly together.
  6) The installer/remover 68 then completes insertion and torques the inserted expansible clamp 60 to secure the skin 30 and the bracket together under a predetermined clamp load.
  7) The end effector 50 then moves over the surface of the skin 30 and bracket 22B, in accordance with a predetermined drilling program, and after drilling the initial permanent hole 40, sequentially drills additional fastener holes 40 (e.g. sized $3/16$ to $5/16$ inch) through both the skin and bracket; e.g., in at least two predetermined locations, including the initial one, all adjacent the expansible clamp 60; i.e., within a several inch radius of the clamp 60.
  8) After the fastener holes are drilled, the end effector 50 is indexed to position the installer/remover 68 over the expansible clamp 60, and the installer remover 68 then untorques and removes the expansible clamp 60.
  9) Next the end effector 50 moves over the surface of the skin 30 to a new pilot hole 28 in either another skin tie or in either spar 12 or spar 14 (FIG. 2), and the steps are replicated until all preprogrammed fastener holes are drilled in the wing box 19.
  10) Finally, the wing box 19 is transferred to a separate assembly station for installation of actual fasteners. For expediting the transfer, some of the Centrix® brand single-sided expansible clamps may be left in place in several of the holes.

The described one up assembly techniques for pre-loading and drilling through mated components, including a skin or panel, may have other variations and alternative constructions not disclosed or suggested. For example, although only final and/or permanent fastener holes are described throughout, the fastener holes could instead be employed as only temporary in some contexts. Although only end effectors for aircraft wings are shown herein, the one up assembly could equally apply to other structures not shown, such as aircraft fuselages. In addition, other items or elements can be modified without loss of efficacy of apparatus and/or of method of this disclosure, such as for example the pair of notches 56 provided in the holster 54 for convenience of quick indexing; a single notch could alternatively be used.

Finally, mated components may be formed of fiber composite materials as well as of metals, such as aluminum alloys. Moreover, the structures may have configurations and shapes, and the processes involved may have movements, and sequences, other than ones herein described, and the disclosure may be applicable to potentially other environments, not mentioned nor suggested herein. For example, the disclosed method could be expanded to include insertion and use of expansible fasteners 60 in some of the fastener holes 40, if desired, and of course after such holes 40 have been drilled during the course of a one up assembly process. Further, although the disclosure presents specific structures in forms as herein depicted, numerous variations of the disclosed structures may be envisioned for use in manufacture of various alternative embodiments.

What is claimed is:
1. An end effector adapted to secure and drill through a pair of components in a one up assembly under clamp loads to avoid separation of the components for deburring after drilling, the end effector comprising:

a single planar face from which extend a vacuum chute, an expansible clamp holster, and an automated drilling head including a drill, a solitary expansible clamp dispenser comprising an opening through the face, the solitary expansible clamp dispenser being configured to insert, expand, and remove expansible clamps into and out of pre-drilled pilot holes in the components during drilling of fastener holes in the components, wherein the end effector is programmed to execute an automated sequence comprising:
dispensing, from the expansible clamp holster via the solitary expansible clamp dispenser, the expansible clamps into the pre-drilled pilot holes,
torquing, via the solitary expansible clamp dispenser, the expansible clamps in the pre-drilled pilot holes to temporarily clamp the components together at selective portions of the components,
drilling, via the automated drilling head, the fastener holes in the components adjacent the expansible clamps,
untorquing, via the solitary expansible clamp dispenser, the expansible clamps, and
removing, via the solitary expansible clamp dispenser, the expansible clamps from the pre-drilled pilot holes during the drilling of the fastener holes in the components.

2. The end effector of claim 1, wherein the expansible clamp holster is rotatable and is configured to selectively supply and retrieve a plurality of the expansible clamps during the drilling of the fastener holes.

3. The end effector of claim 2, wherein the expansible clamp holster is spaced from the drill, is indexable, and is fully automated.

4. The end effector of claim 1, wherein the end effector is applied only to one side of the pair of components.

5. The end effector of claim 4, further comprising an electronic vision camera positioned on the single face and configured to determine positioning and movement of the end effector over the one side of the components.

6. The end effector of claim 1, wherein the end effector is designed to avoid post-drilling separations of the components.

7. The end effector of claim 1, wherein one of the components is a panel.

8. The end effector of claim 1, wherein the end effector is electronically programmed to locate expansible clamp and fastener positions during drilling of the components.

9. The end effector of claim 1, wherein the expansible clamp holster is modular and removable from the end effector for cleaning and reloading.

10. A system comprising:
a plurality of electronically programmable end effectors programmed to sequentially preload and drill selective portions of a workpiece comprising two components to be joined, each of the end effectors including a single planar face from which extend a vacuum chute, an expansible clamp holster, and a drilling head having a drill, a solitary expansible clamp dispenser comprising an opening through the face, the solitary expansible clamp dispenser configured to insert, expand, and remove expansible clamps into and out of pre-drilled pilot holes in the selective portions during a one up assembly for drilling of fastener holes in the two components, wherein each of the end effectors has the expansible clamp holster configured to automatically dispense and retrieve expansible clamps into and from the solitary expansible clamp dispenser to transiently preload together a portion of the two components under a predetermined force during each instance of an automated drilling of a fastener hole in the two components, and wherein each of the end effectors is programmed to execute an automated sequence comprising:
dispensing, from the expansible clamp holster via the solitary expansible clamp dispenser, the expansible clamps into the pre-drilled pilot holes;
torquing, via the solitary expansible clamp dispenser, the expansible clamps in the pre-drilled pilot holes to temporarily clamp the components together;
drilling, via the automated drilling head, the fastener holes in the components adjacent the expansible clamps;
untorquing, via the solitary expansible clamp dispenser, the expansible clamps; and
removing, via the solitary expansible clamp dispenser, the expansible clamps from the pre-drilled pilot holes during the drilling of the fastener holes in the components.

11. The system of claim 10, wherein each of the expansible clamp holsters is rotatable.

12. The system of claim 11, wherein each of the expansible clamp holsters is spaced from the drill, is indexable, and is fully automated.

13. The system of claim 10, wherein each of the electronically programmable end effectors is applied to only one side of the two components.

14. The system of claim 10, wherein each of the electronically programmable end effectors is designed to avoid post-drilling separations of the two components.

15. The system of claim 10, wherein the two components comprise an aircraft wing skin or a fuselage panel.

16. The system of claim 15, wherein each of the electronically programmable end effectors is configured to locate pre-drilled expansible clamp and fastener positions on a portion of an aircraft wing skin or fuselage panel during securement thereof to a rib, spar, frame, or stringer.

17. The system of claim 15, wherein each of the end effectors further includes an electronic vision camera configured to determine positioning and movement of the end effector over an exterior side of the wing skin or the fuselage panel.

18. The system of claim 10, wherein each of the expansible clamp holsters is modular and removable for cleaning and reloading.

19. A method of providing a one up assembly of an aircraft wing skin to a plurality of wing rib and/or spar structures using the end effector of claim 1, the method comprising the steps of:
providing a wing skin and an aircraft wing box having exposed wing rib and/or spar structures;
pre-drilling pilot holes in the wing skin;
applying the wing skin to the wing rib and/or spar structures;
applying the programmable end effector having the drill head and the expansible clamp dispenser to an exterior of the wing skin;
using the end effector to identify a first pilot hole in the wing skin adjacent an initial fastener hole location for installation of a first expansible clamp;
using the end effector dispenser to temporarily insert an expansible clamp into the first pilot hole;

using the end effector to torque the expansible clamp after insertion to achieve a predetermined force between the wing skin and rib and/or spar structures;

identifying additional desired locations of fastener holes immediately adjacent the first pilot hole;

using the end effector to drill a first set of fastener holes immediately adjacent the first pilot hole;

using the end effector to untorque and remove the expansible clamp;

successively indexing the end effector to a next position to drill additional sets of fastener holes in next desired locations;

whereby the aircraft wing skin may be secured to the interior wing rib and/or spar structures and drilled under a clamp load sufficient to avoid in-process wing panel separations for deburring, cleaning, and sealing.

20. The method of claim 19, further including steps of cleaning and sealing the wing skin prior to installation of the wing skin over the wing rib and/or spar structures.

* * * * *